United States Patent

[11] 3,590,162

[72] Inventors Robert Dallemagne; Raymond Lerault, both of Paris, France

[21] Appl. No. 811,395

[22] Filed Mar. 28, 1969

[45] Patented June 29, 1971

[73] Assignee Lignes Telegraphiques et Telephoniques Styled L.T.F. Paris, France

[32] Priority Mar. 29, 1968

[33] France

[31] 146151

[54] SIGNAL DATA TRANSMISSION DEVICE FOR TERMINAL TELEPHONY EQUIPMENT EMPLOYING CARRIER CURRENTS

4 Claims, 2 Drawing Figs.

[52] U.S. Cl. .......... 179/15, 179/2.5, 325/141

[51] Int. Cl. .......... H04j 1/14

[50] Field of Search .......... 179/2.5, 15 BL, 15 BY, 15 BM, 84 VF, 15 FS; 325/141, 40, 42

[56] References Cited

UNITED STATES PATENTS 3,261,922 7/1966 Edson .......... 179/15 (MM)

3,329,774 7/1967 Bradmiller .......... 179/15 (MM)

*Primary Examiner*—Ralph D. Blakeslee

*Attorney*—Abraham A. Saffitz

ABSTRACT: Device for transmitting signaling data signals of low frequency in a multichannel carrier current system. Signaling carrier currents which may have or not the same frequency as the channel carrier currents are modulated by the signalling data signals in half-wave diode modulators, the diodes being controlled by the signalling carrier currents which have an amplitude substantially larger than the signaling data signals. The modulators are connected in parallel to an amplifier with large bandwidth and low input impedance through matching serial resistors. The number of channels of the system is reduced in order not to need individual pass-band filters associated with the modulators.

Figures 1, 2:
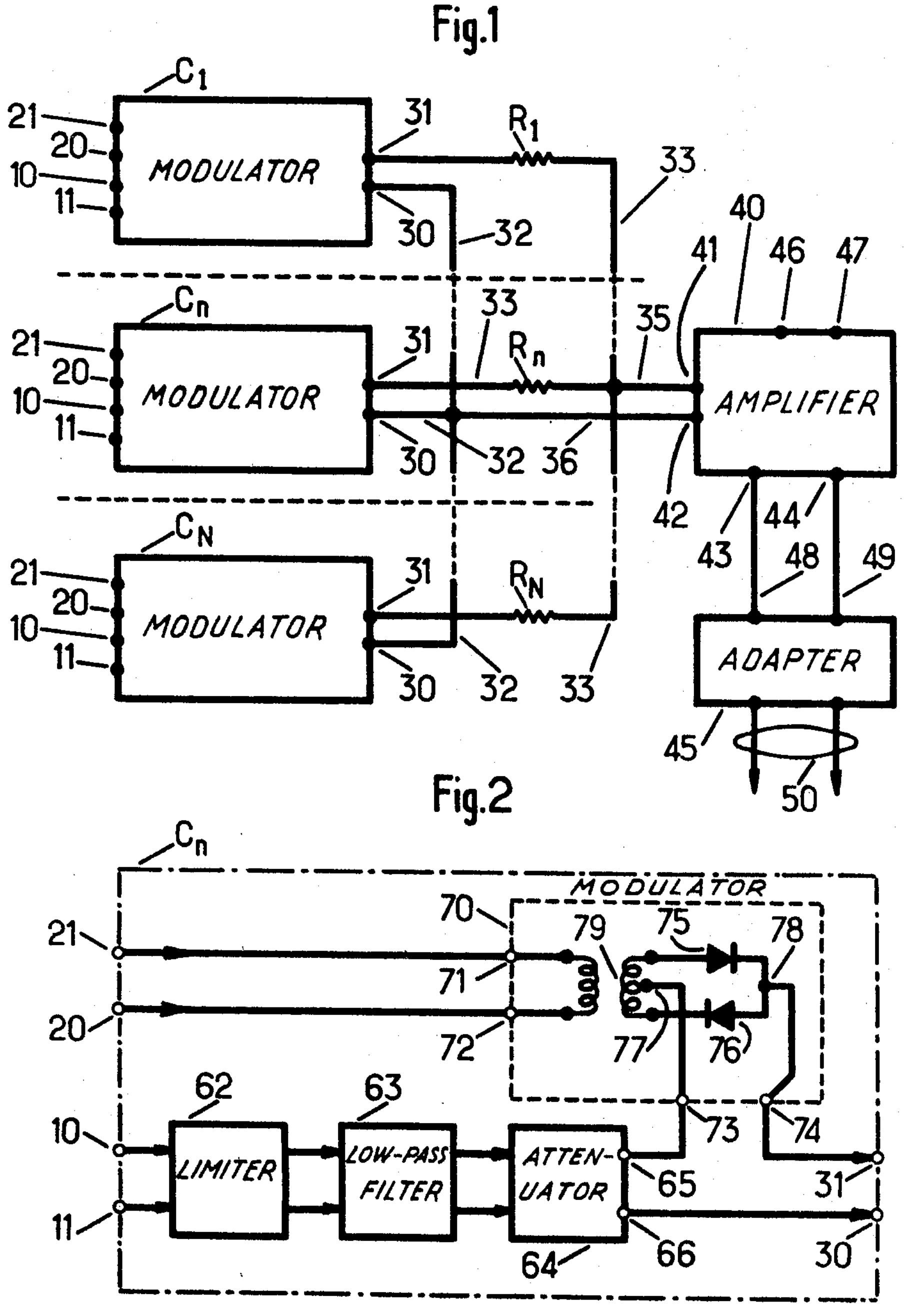

INVENTORS:
Robert DALLEMAGNE
AND Raymond LERAULT
By: Abraham A. Saffitz
ATTORNEY

SIGNAL DATA TRANSMISSION DEVICE FOR TERMINAL TELEPHONY EQUIPMENT EMPLOYING CARRIER CURRENTS

The present invention generally relates to multichannel carrier current systems and more particularly to signalling data modulators for such systems.

In telephony systems employing carrier currents, the frequencies of the channel carriers are spaced apart by 4 kc./sec. as a rule (or are equal even to successive integral multiples of this value), the band occupied for voice transmission extending from 0.3 to 3.4 kHz. The following explanation is most frequently given according to these numerical values, without thereby restricting the general applicability of the device according to the invention.

In the said systems, a signalling data is supplied in the form of a rectangular periodic signal of a frequency $f$, much lower than the frequency interval separating the voice bands of two successive telephone channels, (for example 10 c./s., for the dialing signals in automatic telephony); a signal of this nature will hereinafter be referred to as a "cadenced signal." The transmission of signalling data is performed as a rule in these frequency intervals by modulating a signalling carrier current by the cadenced signal.

In some systems, the frequency, referred to as $F_{sn}$, of the signalling carrier of a channel of number $n$ is that of the carrier of the same channel, $F_n$; in other systems, these two frequencies differ by a quantity $f_s$ the same for all the channels of the system; $f_s$ is comprised as a rule between 0 and 0.3 kHz., or between 3.4 and 4 kHz. For these two signalling methods, it will be stated that the signalling modulation is performed in the channel at zero frequency or at voice frequency.

The modulated signalling current comprises components whose frequencies are close to the various harmonics of the signalling carrier; depending on the quality of the waveform of the said carrier, only components close to odd harmonics of the signalling carrier frequency are present, with frequencies of the form $(2+1)F_{sn}\pm(2m+1)f$ (1) (with $k$ and $m$, small integers or of value 0), or components close to even harmonics of the signalling carrier frequency may also be present (particularly close to $2KF_{sn}$).

Among the said components, and under particular conditions which will be specified hereunder, those which are close to the signalling carrier frequency $F_{sn}$ cannot interfere with the transmission of the voice bands close to this same carrier, nor with the signalling modulated currents of other channels. Based on these components close to the said carrier, it is possible to deliver signalling data of appropriate form at the reception extremity of the system.

Those of the components which are close to the successive harmonics of $F_{sn}$ can interfere with the transmission, in the high-frequency multiplexing circuit, of the voice signals on particular channels, as well as with the signalling modulated currents of the same channels or of other channels.

To prevent the occurrence of faults of this nature, means must be incorporated in the signalling modulator devices. To this end, the known devices as a rule comprise a means specific to each channel, the characteristics of this means depending in particular on the frequency of the signalling carrier.

In particular known embodiments, the cadenced signal applied to the signalling modulator circuit has an amplitude appreciably greater than that of the signalling carrier. The unblocked or blocked state of the modulator circuit is then controlled by the cadenced signal according to the binary value of the same. The signalling modulated current appears during a half-cycle of the cadenced signal, being interrupted during the following half-cycle.

With a modulation of this type, numerous components appear at the output side of the modulator, particularly those whose frequency has the form (1) specified hereinabove; it is necessary to eliminate from this group of components all those which are not very close to the signalling carrier and to the channel carrier. A band filter is arranged at the output side of the modulator circuit, for this purpose. The bandwidth of this filter is very small, relatively speaking, with respect to its center frequency. It is known that the construction of a filter of this kind is costly and difficult. Moreover, as many filters are required as there are channels (one per modulator circuit) and they are all different since their center frequencies are different and widely spaced apart compared to their bandwidth.

In another embodiment, the modulator circuit essentially comprises a modulator having two diodes, the said diodes being connected in series with the same direction of conduction. The blocked and unblocked state of the said diodes are controlled respectively by the two half-waves of the signalling carrier, the amplitude of this carrier being substantially greater than that of the cadenced signal and the frequency spectrum of the same being limited by a low-pass filter before reaching the said modulator. On issuing from the modulation circuit, the signalling modulated current has, successively, a finite value during a half-cycle of the carrier and the value nought during the following half-cycle.

In a device of this kind, with the frequency of the signalling carrier equal to that of the channel carrier and a cadenced signal of relatively small amplitude, the only frequencies to be eliminated in the signalling modulated current are these of the harmonics of the carrier and those of the components close to those harmonics.

To this end, a pass-band or low-pass filter is arranged at the output side of each modulator circuit. The construction of a filter of this nature is relatively simple since the frequencies to be eliminated are distant from the band of the frequencies to be transmitted. For a given terminal or exchange installation however, as many filters are required as there are channels, and these filters are all different.

The device according to the present invention, as the principal advantage compared to the known devices, offers an extreme simplification of the high-frequency filtering elements. A single filter is sufficient in some cases, and may be unnecessary most frequently, as will be set forth in the following.

According to the invention, in a carrier current system with $N$ telephone channels, a device is incorporated for the transmission of signalling data, appertaining respectively to the said $N$ channels and consisting of sequences of periodic rectangular signals of very low frequency, to a high-frequency circuit of the said system, comprising $N$ identical modulator circuits, allotted respectively to each of the said channels, each having two diodes connected in series with the same direction of conduction which are unblocked and blocked by the two half-waves of the signalling carrier, the amplitude of the carrier being substantially greater than that of said very low-frequency signal, and a coupling amplifier with an input terminal connected to the said modulator circuits and with an output terminal connected to said high-frequency circuit, the said device being characterized in that the said amplifier has a very low input impedance and is connected by $N$ resistor connections to the said $N$ modulator circuits.

According to another feature of the invention, a relationship is established between the magnitudes of the frequency interval $B$ which separates the frequencies of two successive channel carriers, the lowest frequency $F_1$ of the channel carriers of the system, and the number $N$ of the modulation circuits of the device; and said relationship is:

$F_1$ is equal to or greater than $N{\cdot}B/2$, if the signaling operation is performed at the zero frequency of the channel $F_1$ is equal to or greater than $(N+1)B$, if the signaling operation is performed at a voice frequency $f_s$ of the channel.

The features and advantages of the invention will emerge more clearly upon reading the following description, and from the drawings accompanying these, the said descriptions and drawings being given by way of nonlimiting example.

FIG. 1 is a block diagram of one embodiment of a device according to the invention; and FIG. 2 is a functional diagram of a modulator circuit of the device illustrated in FIG. 1

In FIG. 1, the rectangles marked $C_1$, $C_n$, and $C_N$ respectively, represent the $N$ modulator circuits of the device, allotted respectively to the channel of the order 1, ... $n$, .... $N$ of the terminal installation in question; each of these circuits comprises two input terminals 10, 11 to which is applied the said cadenced signaling signal, two other input terminals 20, 21 to which is applied the said signalling carrier of the channel, and two output terminals 30, 31 at which appears the said signaling modulated current.

The modulated currents formed by the $N$ modulation circuits $C_1$, ... $C_n$, ... $C_N$, must be transmitted into a high frequency circuit of the system such as a group modulator the connection leads to this high-frequency circuit being shown at 50 in the Figure.

The element 40 is a wide-band amplifier having input terminals 41—42 and output terminals 43—44, the amplifier 40 having an input impedance of very low value. The input terminals 41—42 are connected to the terminals 30—31 of each of the $N$ modulator circuits by means of connection leads 32, 33 for each of the said circuits, extended by the common conductors 35, 36. In each of the said connection leads 32—33 is inserted an adapting resistance $R_1$, ... $R_n$, .. $R_N$. The input impedance of the amplifier 40 being practically nought, the said resistances should have values equal, respectively to the output impedance of the corresponding modulator circuit.

An adapter means 45 to said high-frequency circuit is connected to the output terminals 43—44.

FIG. 2 provides a more detailed illustration of the common structure of the $N$ modulator circuits $C_1$, ... $C_n$, ... $C_N$.

The circuit $C_n$ principally comprises a modulator 70 with two input terminals 71—72 for the signaling carrier and two terminals 73—74 serving both as input terminals for the signaling data signal and as output terminals for the signaling modulated signal.

The circuit $C_n$ has two input terminals 10, 11 connected to a chain of circuits consisting of an amplitude limiter 62, a low-pass filter 63, and an attenuator circuit 64. The filter 63 has a very low cutoff frequency merely exceeding the small integral multiples of the frequency of the cadenced signals. The circuit 64 is provided with an input impedance equal to the output impedance of the filter 63 (the reason will be specified hereinafter). In the circuit shown in FIG. 2, the outputs 65—66 of circuit 64 and 73—74 of circuit 70 are serially connected.

The input terminals 71—72 of modulator 70 are connected, respectively, to the input terminals 20, 21 of the circuit $C_n$, and to a transformer 79 the secondary winding of which is connected to two serially connected diodes 75 and 76 installed in the same direction of conduction. The said secondary winding has a central tapping 77 connected to the input terminal 71, while the point 78 common to the two diodes is connected to the terminal 74 of modulator 70, this terminal itself being connected to the output terminal 31 of the circuit $C_n$.

The cadenced signaling current applied to the input 73—74 of 70 has a substantially smaller amplitude than that of the signalling carrier current appearing at the terminals of the secondary winding of transformer 79, so that the unblocked state of the two diodes, or their blocked state is controlled at the frequency of said carrier, these states being established alternately during the successive half-waves of the carrier. The modulated signalling current appears at the output 30—31 during one of two of the said half-waves, while during the following half-wave, the modulator has an infinite impedance at the input terminal 73—74 and no current appears at the output 30—31. The attenuator circuit 64 allows the impedances between the output of the filter 63 and the input 73—74 of the modulator to be matched, so that the said filter output is not in open-circuit condition during the half-wave during which the modulator is in its blocked state. The low-pass filter is arranged with a cutoff frequency such that it allows of passage only of the first harmonics of the cadenced signal, up to and for example including the 5th order harmonic.

In the following are described successively the operation of the device according to the invention and the relationships in magnitude which should be fulfilled by the frequencies of the carrier currents, depending on whether the same is employed in a telecommunication system in which the signaling transmission is performed at zero frequency in the channel or at a voice frequency.

The first of these two cases is examined hereinafter. The common frequency of the channel carrier and of the signaling carrier is $F_n$ for the channel of the order $n$, while the frequency $f$ of the said cadenced signal is assumed to be equal to 10 Hz.

When the signalling carrier current has a substantially symmetrical waveform (in the sense that the negative half-waves are equal to the positive half-waves of inverted sign), the spectrum of the signalling modulated current comprises only the components of the odd harmonics of $F_n$, whose frequencies for example, are those appearing in the lists a, b, c hereunder.

| a | b | c |
|---|---|---|
| $F_n$+10 Hz | 3 $F_n$+10 Hz | 5 $F_n$+10 Hz. |
| $F_n$−10 Hz. | 3 $F_n$−10 Hz. | 5 $F_n$−10 Hz. |
| $F_n$+30 Hz | 3 $F_n$+30 Hz | 5 $F_n$+30 Hz. |
| $F_n$−30 Hz | 3 $F_n$−30 Hz | 5 $F_n$−30 Hz. |
| $F_n$+50 Hz | 3 $F_n$+50 Hz | 5 $F_n$+50 Hz. |
| $F_n$−50 Hz. | 3 $F_n$−50 Hz | 5 $F_n$−50 Hz. |

The amplitudes of the even harmonics are negligible.

In the normal conditions of operation of the sources of carrier currents, the 3rd order harmonic is at a level lower by approximately 1 Neper than that of the carrier, while the 5th harmonic has an even lower level, the higher-order harmonics being negligible.

If the waveform of the signalling carrier is lacking in symmetry, the said modulated signalling current contains components close to the even-order harmonics of the signalling carrier, the 2nd order harmonic being apt to have a level lower by 3 to 4 Nepers than that of the carrier current.

The different components cited hereinabove are thus grouped in narrow frequency bands close to the harmonics of the carrier current and they cannot interfere with the transmission of the voice signals of the other channels of the terminal equipment since the frequencies of the carriers are integral multiples of 4 kHz., $F_n$ being one of these multiples.

Those of the said components which are close to 2 $F_n$ are at too low a level to be apt to interfere with the signaling data transmission applied to the channel having the carrier frequency 2 $F_n$.

Contrarily, the components close to the 3rd order harmonic (series $b$ in the list given hereinabove) can interfere with the signalling data transmission applied to a channel of the system whose carrier has the frequency 3 $F_n$.

To avoid the disadvantages resulting therefrom, an appropriate selection is made of the extreme frequencies of the carriers of the $N$ channels, in such manner as to fulfill one or the other of the relationships hereunder (the unit being one kilohertz):

$$3F_1 \geq F_N + 4 \quad (2)$$

$$3F_1 > F_N \quad (3)$$

depending on whether the upper or lower modulation band of the channel carrier is employed in the system.

The frequency $F_N$ having the value $F_1$+4($N$−1) relationships (2) and (3) above are reduced to, respectively, $F_1 \geq 2N$ (4), $F_1 > 2(N-1)$ (5)

The relationships (4) and (5) can be generalized easily, if $B$ is the bandwidth allocated to a transmission channel:

$F_N = F_1 + (N-1)B$, and the condition to be established is expressed, in the two cases cited above respectively, by:

$F_1 \geq N \cdot B/2$ (6) or $F_1 > (N-1)B/2$ (7)

An analogous explanation applies to the operation of the device when the signaling transmission is performed whilst employing a signaling carrier whose frequency $F_{sn}$ is linked to that of the channel carrier by one or the other of the relationships:

$F_{sn} = F_n$sn$+f_s$ (8) $F_{sn} = F_n - f_s$ (9) depending on whether the upper or the lower modulation band is employed, $F_{sn}$ is always comprised within an interval separating two successive voice transmission frequency bands, for the said group of $N$ channels, and with the limiting values of $f_s$ cited hereinabove.

In this case, particularly owing to the value of $f_s$, the frequencies of the components grouped around particular harmonics can be comprised within the voice transmission bands of higher order channels of the group. In particular, the components close to the 2nd order harmonic of the carrier $F_{sn}$ (which are of insufficient level to interfere with the transmission of signaling data on a channel whose signaling carrier frequency is 2 $F_{sn}$), are apt to interfere with the transmission of voice signals on a channel of higher order than $n$, if their frequency lies within the voice band in the said channel. The interference phenomena having this origin are eliminated by picking extreme channel carrier frequencies which fulfill one or the other of the relationships:

$2F_{s1} \geq F_N AzB$ (10)

$2F_{s1} > F_N$ (11) depending on whether the upper or lower channel carrier modulation band is employed in the system.

But the following is also applicable:

$F_N = F_1 + (N-1)B$ : in both cases, and $F_{s1} = F_1 + f_s$ : in the case of the relationship (10), $F_{s1} = F_1 - f_s$ : in the case of the relationship (11).

In the first case, this results in : $F_1 \geq N \cdot B - 2f_s$ which is established with: $F_1 \geq N \cdot B$ (12).

In the case of the relationship (11), the following results:

$F_1 \geq (N-1)B + 2f_s$

In this last case however, $f_s$ is relatively close to $B$ as a rule, whilst remaining lower than the same. For example, the signaling frequency is at 3825 Hz. and below the channel carrier in the signaling method referred to as "of 3825 frequency," employed sometimes when the value of $B$ is 4 kilohertz.

It is plain that the condition to be fulfilled certainly should be, when: $F_1 \geq (N+1)B$ (13)

In each of the cases examined, it is observed that it is sufficient for one of the relationships cited to be fulfilled for the other to be fulfilled as well, for example:

— the relationship (6) implies the inequality (7),

— the relationship (13) implies the inequality (12).

Consequently, it is possible to retain a single relationship of magnitude for each group of two, (6) and (7) on the one hand, (12) and (13) on the other hand. These relationships will be:

$F_1 \geq N \cdot B/2$ (6) if the signaling operation is performed at zero frequency in the channel $F_1 \geq (N+1)B$ (13) if the signaling operation is performed at voice frequency $f_s$.

In a device according to the invention illustrated in FIG. 1, the structure of the connection means 45 depends on the nature of the totality of the data which are to be transmitted by the high-frequency circuit 50.

In the case in which this grouping comprises only the voice and signaling data relating to the said set of $N$ channels, there are no other risks of interference with the transmission than those specified hereinabove. The connection means 45 will have a structure appropriate for adaptation of the impedances between the output 43—44 of the amplifier 40 and the leads 50, towards the high-frequency circuits. A case of this nature arises if the said set is to undergo another modulation (for example from primary group to secondary group set).

Another case is that in which the circuit 50 having a sufficient bandwidth, is intended to transmit, apart from the said group of data, other data equally transmitted by carrier currents in different frequency bands, for example those relating to other groups or sets of channels of the same system. In this case, the connection means 45 principally comprises a passband filter device for the range of frequencies corresponding to the said group or set of $N$ channels. By means of this device, the higher components than the said frequency range which could originate from circuits $C_1, \ldots, C_N$, are eliminated altogether.

FIG. 1 shows terminals 46, 47 in amplifier 40; these are incorporated if the group of voice signals corresponding to the said $N$ channels is applied to the high-frequency circuit via leads 50 through the said amplifier, which then has a second input separate from 41, 42. The application of such signals for transmission purposes in the high-frequency circuit may however equally be arranged at a point of the path of the conductors 48, 49 which terminate at the input of the connection means 45.

The preceding explanations demonstrate that the device according to the invention offers an economical solution to the problem of the transmission of signaling data in a telephony system employing carrier currents. Each of the $N$ modulator circuits comprises a low-pass filter, preferably having a very low cutoff frequency, to eliminate the harmonics of the cadenced current; a filter of this kind has a simple and inexpensive construction; moreover, it eliminates the need for a filter for high-frequency currents whose construction may, as known, be difficult and laborious, owing to the high selectivity required.

In particular and relatively infrequent cases, the connection means 45 comprises a wide-band high frequency filter. This filter is then of simple construction and uncomplicated, the required selectivity being low.

Another advantage of the device according to the invention resides in the fact that the $N$ circuits $C_n$ may have identical features resulting in common characteristics, since the ratio of the extreme frequencies of the carriers is not high with respect to unity. This also has a favorable effect on its practical embodiment and on costs.

Finally, an analogous device may be incorporated for signaling transmission in a system in which the signaling carriers have the zero frequency in the channels or in a system having a voice signaling carrier frequency in the channels. The comparative examination of the relationships (6) on the one hand and (13) on the other hand demonstrates, in point of fact, that an analogous device can be employed in different cases, whether the same frequency $F_1$ is retained for the first channel signaling carrier and the number of channels and thus the number of modulator circuits in operation is determined according to one of the relationships (6) and (13) hereinabove, or whether the number of channels in operation is the same, being $N$ for example, and the frequency is determined according to one of these same relationships according to the application contemplated.

What we claim is:

1. In a multichannel carrier current system comprising a plurality $N$ of channels for the transmission of telephone communications, said channels having carrier frequencies spaced apart by a frequency interval of $B$ and the number $N$ of channels being smaller than $(F_1/B-1)$, where $F_1$ is the lowest channel carrier frequency, a transmitter of signaling data relative to said communications comprising a plurality of modulators for modulating said signaling data signals by carrier currents having an amplitude substantially larger than the amplitude of the signaling data signal and frequencies inside said channels and different from the channel carrier frequencies, each modulator comprising two diodes serially connected in the same direction of conduction, means for applying said signaling data signals to said diodes and for controlling the conduction of said diodes by said carrier currents whereby a modulated current is obtained during half-waves of the carrier currents and a zero current during the other half-waves, an amplifier having a low input impedance, means for serially connecting said modulator to a resistor having a resistance substantially equal to the output impedance thereof and means for connecting in parallel said modulators and resistors to the input of said amplifier.

2. In a multichannel carrier current system comprising a plurality $N$ of channels for the transmission of telephone communications, said channels having carrier frequencies spaced apart by a frequency interval of $B$ and the number $N$ of channels being smaller than $2F_1/B$, where $F_1$ is the lowest channel carrier frequency, a transmitter of signaling data relative to said communications comprising a plurality of modulators for modulating said signaling data signals by carrier currents having an amplitude substantially larger than the amplitude of the signaling data signal and frequencies respectively equal to the channel carrier frequencies, each modulator comprising two diodes serially connected in the same direction of conduction, means for applying said signaling data signals to said diodes and for controlling the conduction of said diodes by said carrier currents whereby a modulated current is obtained during half-waves of the carrier currents and a zero current during the other half-waves, an amplifier having a low input impedance, means for serially connecting said modulator to a resistor having a resistance substantially equal to the output impedance thereof and means for connecting in parallel said modulators and resistors to the input of said amplifier.

3. In a multichannel carrier current system comprising a plurality of groups of $N$ frequency channels for the transmission of telephone communications, said channels in a group having carrier frequencies spaced apart by a frequency interval of $B$ and the number $N$ of channels being smaller than $(F_1/B1)$, where $F_1$ is the lowest channel carrier frequency, a transmitter of signaling data signals relative to said communications comprising groups of $N$ modulators for modulating said signaling data signals by carrier currents having an amplitude substantially larger than the amplitude of the signaling data signal and frequencies inside said channels and different from the channel carrier frequencies, each modulator comprising two diodes serially connected in the same direction of conduction, means for applying said signaling data signals to said diodes and for controlling the conduction of said diodes by said carrier currents whereby a modulated current is obtained during half-waves of the carrier currents and a zero current during the other half-waves, a plurality of amplifiers respectively associated with the modulator groups and having a low input impedance, means for serially connecting each modulator of a group to an associated resistor having a resistance substantially equal to the output impedance thereof, means for connecting in parallel the modulators of a group and the associated resistors to the input of an amplifier, band pass filter means respectively associated with the amplifiers for filtering the groups of frequency channels and means for frequency multiplexing said channel groups.

4. In a multichannel carrier current system comprising a plurality of groups of $N$ frequency channels for the transmission of telephone communications, said channels in a group having carrier frequencies spaced apart by a frequency interval of $B$ and the number $N$ of channels being smaller than $2F_1/B$, where $F_1$ is the lowest channel carrier frequency, a transmitter of signaling data signals relative to said communications comprising groups of $N$ modulators for modulating said signaling data signals by carrier currents having an amplitude larger than the amplitude of the signaling data signal and frequencies respectively equal to the channel carrier frequencies, each modulator comprising two diodes serially connected in the same direction of conduction, means for applying said signaling data signals to said diodes and for controlling the conduction of said diodes by said carrier currents whereby a modulated current is obtained during half-waves of the carrier currents and a zero current during the other half-waves, a plurality of amplifiers respectively associated with the modulator groups and having a low input impedance, means for serially connecting each modulator of a group to an associated resistor having a resistance substantially equal to the output impedance thereof, means for connecting in parallel the modulators of a group and the associated resistors to the input of an amplifier, band pass filter means respectively associated with the amplifiers for filtering the groups of frequency channels and means for frequency multiplexing said channel groups.